United States Patent [19]

Eiselbrecher et al.

[11] 4,183,261

[45] Jan. 15, 1980

[54] SHACKLE

[75] Inventors: Max Eiselbrecher, Unterpfaffenhofen; Rolf Günther, Munich; Helmut Jakob, Zorneding, all of Fed. Rep. of Germany

[73] Assignee: Messerschmitt-Bolkow-Blohm GmbH, Munich, Fed. Rep. of Germany

[21] Appl. No.: 861,692

[22] Filed: Dec. 19, 1977

[30] Foreign Application Priority Data

Dec. 21, 1976 [DE] Fed. Rep. of Germany ....... 2657832

[51] Int. Cl.$^2$ .................... G05G 1/00; A44B 21/00
[52] U.S. Cl. .................... 74/579 R; 24/73 A; 24/73 R; 416/134 A; 24/265 EE
[58] Field of Search ............. 24/265 EE, 73 R, 73 A; 416/134 A; 74/579 R

[56] References Cited

U.S. PATENT DOCUMENTS

| | | | |
|---|---|---|---|
| 3,362,252 | 1/1968 | Ditlinger | 74/579 R |
| 3,370,483 | 2/1968 | Ditlinger | 24/265 EE |
| 3,411,379 | 11/1968 | Deyerling | 74/579 R |
| 3,434,373 | 3/1969 | Ditlinger | 416/134 A |
| 3,475,988 | 11/1969 | Ditlinger | 74/579 R |
| 3,669,566 | 6/1972 | Bourquardez | 416/134 A |
| 3,692,361 | 9/1972 | Kullavik | 24/265 EE |
| 3,725,981 | 4/1973 | Pinckney | 24/122.3 |
| 4,038,885 | 8/1977 | Jonda | 74/579 R |
| 4,050,827 | 9/1977 | Jonda | 24/122.6 |

FOREIGN PATENT DOCUMENTS 599723 11/1959 Italy ............................................ 74/579

*Primary Examiner*—Bernard A. Gelak
*Attorney, Agent, or Firm*—W. G. Fasse; D. F. Gould

[57] ABSTRACT

The present shackle is especially constructed for securing a wing to the fuselage of an aircraft or of a spacecraft. For this purpose the elements of the shackle intended for taking up pressure and tensile forces as well as the elements providing the necessary structural stability are made of fiber compound materials such as carbon or boron fibers.

17 Claims, 4 Drawing Figures

SHACKLE

BACKGROUND OF THE INVENTION

The present invention relates to a shackle, preferably for securing a wing to the fuselage of an aircraft or a spacecraft. Many different constructions of shackle devices are known in the art and such devices are used for many different purposes. Thus, shackles are used, for example, to interconnect chains. However, in certain countries, for example, in Germany, the industrial standards require that shackles for interconnecting chains are used only as a temporary, makeshift connecting element. Such a requirement is understandable if one takes into account that due to the use of high strength chain materials the dimensions of the individuell chain links have been reduced substantially, whereas the dimensions of prior art shackles cannot be reduced without special precautions, because otherwise the respective strength values of the shackle would be heavily influenced by such reduced shackle dimensions. In order to overcome this limitation of prior art shackles, special shackle constructions have been developed heretofore which are compact and which also have the necessary structural strength.

Thus, German Patent Publication (DAS No. 11 40 411) discloses a chain lock comprising an intermediate element constructed as a ring bandage. The ring bandage is latched to the leg ends extending into the bandage, by means of cross pins. Such cross pins are intended to securely take up any occurring bending forces and to provide a substantial variability in the size or dimensions of the chain lock. However, this type of prior art structure is not designed to substantially reduce the weight of the shackle structure because the forces to be taken up by the shackle determine the dimension of the force transmitting elements of the shackle as well as the selection of material of which the shackle is made. Thus, where the forces to be taken up are rather large as is the case in aircraft and spacecraft manufacture, it is necessary to make the just described type of chain lock with rather large dimensions which necessarily result in a heavy weight of the structure.

German Pat. No. 292 705 discloses a spring elastic shackle having a bail for taking up the tensile forces, for example, when pulling railroad cars or mine trollies. The bail is constructed as a screw spring, the spring excursion of which is limited by a rigid insert. However, these features also do not provide an improvement of the weight ratios and the dimension ratios, because the bending forces to be taken up by the holding eyelets and by the cross axle require a very certain dimensioning which cannot be reduced. The only purpose of using a screw spring as a tension bail in the prior art shackle is to make the shackle adaptable for different types of transportation vehicles.

OBJECTS OF THE INVENTION

In view of the foregoing, it is the aim of the invention to achieve the following objects singly or in combination:

- to provide a shackle of substantial strength, yet of lightweight structure, which is, for example, suitable for securing a wing to the fuselage of an aircraft or a spacecraft;
- to construct a shackle in such a manner and from such materials that the weight and dimension ratio is most advantageous;
- to provide a shackle structure in which starting cracks do not necessarily result in an immediate total fracture to thereby decrease the vulnerability of aircraft especially military aircraft; and
- to construct the shackle in such a manner that each of its elements is subjected substantially only to those loads for which it is constructed, namely for tensile loads or pressure loads but not both.

SUMMARY OF THE INVENTION

According to the invention, there is provided a shackle, especially for securing a wing to the fuselage of an aircraft or a spacecraft, which is characterized in that the elements of the shackle which are intended for taking up tensile forces, as well as the elements which are intended for taking up pressure forces, and the elements provided for the stability of the shackle structure are all made of fiber compound materials.

According to the invention a high strength securing means has been provided in which the tensile strength and the pressure resistance is accomplished by using laminate fiber structures, in which the fibers extend in a uniform direction, whereby it has become possible to save approximately 30% of the weight without reducing the strength characteristics as compared to prior art structures. Further, shackles according to the invention have a substantially larger effective operational life than prior art structures of this type. This is primarily due to the fact that according to the invention the direction of the winding of the fiber threads in the individual structural elements extend substantially in the directions of the respective force to be taken up. In this manner each structural element is subjected only to one type of load. In other words, the respective force causing the load is effective only in one direction and the structural element is substantially relieved of all other forces.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
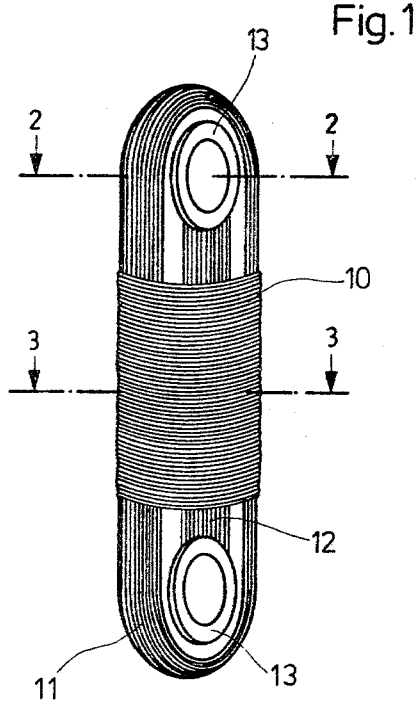
FIG. 1 is a perspective view of one embodiment of a shackle according to the invention.
Figure 2:
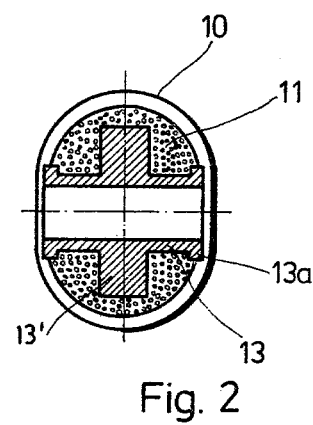
FIG. 2 is a sectional view along the section line 2—2 in FIG. 1.
Figure 3:
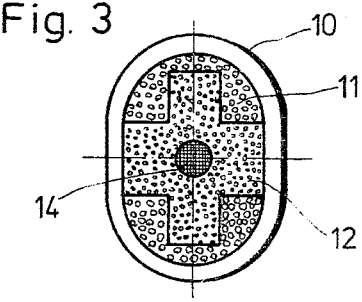
FIG. 3 is a sectional view along section line 3—3 in FIG. 1.

The perspective illustration of one embodiment of the invention as shown in FIG. 1, comprises two metal bushings 13 which are kept at a predetermined spacing from each other by means of a pressure core 12 which thus takes up substantially only compressive forces. The pressure core 12 is made of synthetic materials reinforced by boron fibers which extend substantially in the direction of the compressive forces to be taken up by said pressure core 12. The metal bushings 13 may, for example, be made of steel. Each bushing is provided at its outer ends with a flange 13a, as best seen in FIG. 2. FIG. 2 further shows that each bushing 13 has a thickened ring portion 13b intermediate the flange 13a, whereby the projected or cross-sectional area of the bushing 13 is somewhat cross-shaped as illustrated. The pressure core 12 of said boron fiber reinforced compound material also has a cross-sectional or projected configuration corresponding to the cross-shape shown in FIG. 3. The cross-shaped configurations shown in FIGS. 2 and 3 substantially improve the buckling strength of the shackle. The outer flanges 13a prevent the windings of the so-called tension loop 11 from sliding off the projected surface area of the bushings which corresponds to the projected surface area of the pressure core 12. The bushings are held in position relative to the pressure core 12 by means of said tension loop 11 mainly consisting of carbon fibers but also made of fiber reinforced compound materials such as glass fibers reinforced by carbon fibers whereby the tension loop takes up substantially only tension loads. The synthetic material may also, for example, be of the type known as glass fibers reinforced by fibers made of Kevlar (trade name). Kevlar is a high tension composite material. In order to conform the configuration of the bushings 13 as nearly as possible to the pressure cone, which will be established when loads are applied to the shackle, the bushings may have various shapes. Thus, in FIG. 1 the surface area of the bushings 13, which contact the pressure core 12, is convex and the respective surface area at each end of the pressure core is concave.

Figure 4:
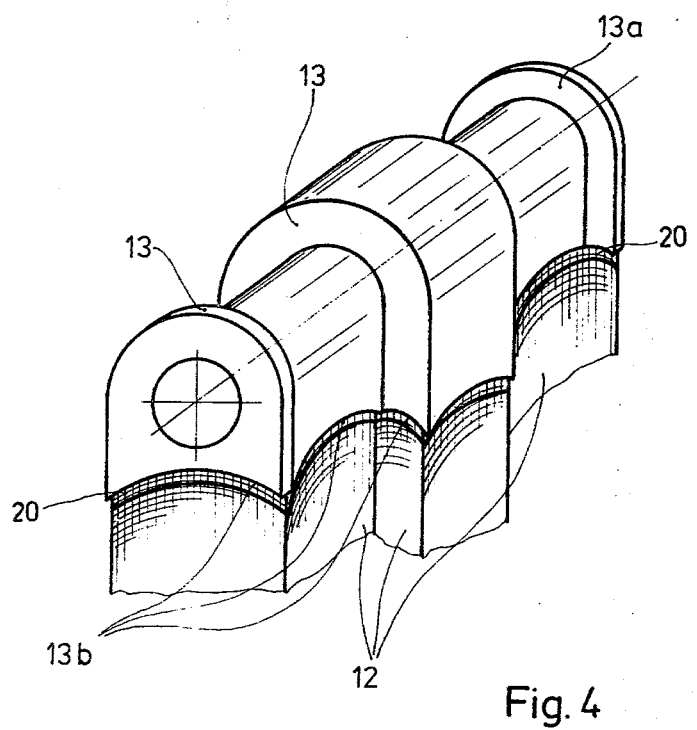
FIG. 4 is a perspective view of a modified embodiment of a shackle according to the invention showing the upper half only, whereby the loop of fiber materials for taking up tension has been omitted for simplicity's sake.

In the embodiment shown in FIG. 4 the arrangement is vice versa. The projection surfaces 13b of the bushing 13 is concave, whereas the respective ends of the pressure core 12 are convex. This type of arrangement facilitates the establishing of the so-called pressure cone within the confines of the pressure core 12, when pressure loads are applied. The bushings 13 may be constructed so that they may function as the outer race of a pivot or journal bearing. This feature further reduces the weight and structural size of the present shackle.

The structure according to the invention prevents the propagation of any cracks in the bushings 13 throughout the structure. Thus, such cracks cannot extend throughout the supporting components of the shackle. Contrary thereto, in prior art shackles made completely of metal, any beginning crack usually propagates quickly throughout the supporting structure, thereby causing its destruction. In shackles according to the invention this is not so and therefore the present shackles are also advantageous with regard to their superior safety characteristics, which is especially advantageous in air and space travel.

As mentioned, the cross-section of the core 12 corresponds to the projection area of the bushing 13, and the contacting surfaces may have the above described cooperating concave and convex shapes. If desired, a force distribution layer 20, for example, of epoxy resin may be inserted between the pressure core and the respective bushing. Such force distribution materials could preferably be hardenable by curing. Further, the pressure core 12 may be reinforced by a metal matrix.

The cross-sectional shape of the pressure core 12 is, as mentioned, especially advantageous to improve the buckling strength of the structure. However, a further weight reduction may be achieved by providing the pressure core 12 with a central element 14 of hard foam. The central element 14 may, for example, have a round cross-section. Incidently, the individual threads of the core extend substantially in parallel to the central, longitudinal axis of the core.

The core 12 and the bushings 13 are held together by the windings of the tension loop 11 made of carbon fibers or synthetic material reinforced by Kevlar (trade name). Here again, the individual fibers extend in the direction of the occurring tension forces. The fibers are laminated to each other to form a compound structure. The winding of the tension loop 11 is arranged in such a manner, that its shape substantially confines the tension cone resulting from the application of a tension loop. This shape is normally substantially hemispherical as illustrated in FIG. 1 with somewhat flattened opposite sides. The formation of such a shape is facilitated by the lateral flanges 13a, which hold the individual fibers in position as they are being wound.

In order to diminish tension load peaks, it is suggested that the first windings, namely those close to the core 12, are made of a material which is softer than the remaining synthetic material of the tension loop 11. Such relatively soft material may, for example, be glass fibers also known under the trade name "GFK".

A bandage winding 10 surrounds according to the invention the tension loop 11. The fibers of the bandage winding 10 extend in directions substantially perpendicular to the direction of the fibers in the tension loop 11 and in the pressure core 12. The fibers of the bandage winding 10 may also be of the carbon type or of a synthetic material reinforced with Kevlar. The bandage 10 is located substantially intermediate between the two bushings 13 and may take up as much of that space as is necessary for particular purposes. If desired, the individual turns of the bandage winding 10 may be arranged in cross-over fashion. In any event, the bandage is substantially circular in cross-section as it surrounds the pressure core 12 and the tension loop 11, whereby the bandage 10 prevents the occurrence of tension loads along the edges.

The features of the invention as described result in a shackle device, wherein the advantageous characteristics of fiber compound materials are fully effective in an optimal manner thereby resulting in a substantial weight reduction up to 30% without any loss in strength relative to comparable prior art shackles. Further, since each structural component of the shackle takes up only one type of load, namely a pressure load or a tension load, the effective life of the present shackle has also been substantially increased compared to prior art shackles made entirely of metal. The increased operational life of the present shackles is due to the fact, that cracks or mechanical damages normally do not immediately destroy the entire shackle, whereby the safety of these shackles is substantially increased. This is of special importance in air and space travel. Summarizing, each element is utilized in an optimal manner in accordance with the characteristic features of fiber compound materials.

Although the invention has been described with reference to specific example embodiments, it will be appreciated, that it is intended, to cover all modifications and equivalents within the scope of the appended claims.

What is claimed is:

1. A shackle comprising metal insert means that comprises a pair of spaced eye bushings, pressure core means engaging and extending between said bushings spacing said metal insert means, and tension loop means holding the metal insert means and the pressure core means together, said pressure core means and said tension loop means being made of fiber compound materials, said pressure core means and said tension loop means of said fiber compound materials comprising fiber windings, said fiber windings of said loop means passing around both bushings and extending tangentially away from said bushing parallel to each other, the parallel portions of said loop means engaging and being parallel to said core means wherein the individual fibers extend in the direction of the force to be taken up by the respective fiber winding, whereby said pressure core means take up substantially only compressive forces, and said tension loop means take up substantially only tension loads.

2. The shackle of claim 1, further comprising bandage means surrounding said tension loop means, said bandage means also being made of fiber compound materials.

3. The shackle of claim 1, wherein said metal insert means has a given projection surface area, said pressure core means having substantially the same projection surface area, said tension loop means enveloping said metal insert means and said pressure core means, said shackle further comprising bandage winding means of fiber compound materials surrounding said pressure core means and said tension loop means between said metal insert means, said bandage winding means having fibers extending in a direction substantially at right angles to the direction in which the fibers of said tension loop means and the fibers of said pressure core means extend.

4. The shackle of claim 1, wherein said bushings have flange means forming the respective outer ends thereof.

5. The shackle of claim 1, wherein said bushings have a cross-sectional configuration corresponding substantially to the cross-sectional configuration of said pressure core means.

6. The shackle of claim 5, wherein both of said cross-sectional configurations substantially have the shape of a cross.

7. The shackle of claim 1, wherein said bushings have the shape of the outer race of a pivot bearing.

8. The shackle of claim 1, wherein said tension loop means are wound from a plurality of individual fiber threads which envelope said metal insert means substantially in the shape of a hemisphere whereby the respective cone of tension forces is substantially compensated.

9. The shackle of claim 8, wherein said tension loop means comprises windings of different types of fiber threads, whereby the first windings adjacent to the pressure core means are made of softer fiber material than the windings further away from said pressure core means.

10. The shackle of claim 1, wherein said pressure core means have a given cross-sectional shape corresponding to the projection surface of said metal insert means.

11. The shackle of claim 1, wherein said pressure core means has a surface area of convex configuration and said metal insert means has a surface area of concave configuration, said surface areas contacting each other.

12. The shackle of claim 1, wherein said pressure core means has a surface area of concave configuration and said metal insert means has a surface area of convex configuration, said surface areas contacting each other.

13. The shackle of claim 1, wherein said pressure core means and said metal insert means each comprise a respective contacting surface, said shackle further comprising force distributing means operatively inserted between said contacting surfaces.

14. The shackle of claim 13, wherein said force distributing means comprise a filler material which is hardenable by curing.

15. The shackle of claim 1, wherein said pressure core means of fiber compound materials comprises a metal reinforcing matrix.

16. The shackle of claim 1, further comprising bandage means of fiber compound materials surrounding said tension loop means, said fiber compound materials comprising individual fibers wound in cross-over fashion.

17. A shackle comprising metal insert means, pressure core means spacing said metal insert means, and tension loop means holding the metal insert means and the pressure core means together, said pressure core means and said tension loop means being made of fiber compound materials, said tension loop means being wound from a plurality of individual fiber threads which envelope said metal insert means substantially in the shape of a hemisphere whereby the respective cone of tension forces is substantially compensated, said tension loop means comprising windings of different types of fiber threads, whereby the first windings adjacent to the pressure core means are made of softer fiber material than the windings further away from said pressure core means, said pressure core means and said tension loop means of said fiber compound materials comprising fiber windings, wherein the individual fibers extend in the direction of the force to be taken up by the respective fiber winding, whereby said pressure core means take up substantially only compressive forces, and said tension loop means take up substantially only tension loads.

* * * * *